United States Patent [19]

Natarajan et al.

[11] Patent Number: 4,752,890
[45] Date of Patent: Jun. 21, 1988

[54] ADAPTIVE MECHANISMS FOR EXECUTION OF SEQUENTIAL DECISIONS

[75] Inventors: Kadathur S. Natarajan, Somers; Harold S. Stone, Chappaqua, both of N.Y.

[73] Assignee: International Business Machines Corp., Armonk, N.Y.

[21] Appl. No.: 885,101

[22] Filed: Jul. 14, 1986

[51] Int. Cl.[4] ............ G06F 15/46; G06F 15/18; G06K 9/62
[52] U.S. Cl. .................. 364/513; 364/300; 364/900; 364/148; 382/15; 382/37; 382/39
[58] Field of Search ............ 364/513, 148, 149–151, 364/152, 156, 200 MS File, 300, 900 MS File, 140, 141; 382/14, 15, 27, 1, 36–39, 48, 50; 307/201

[56] References Cited

U.S. PATENT DOCUMENTS

| | | | |
|---|---|---|---|
| 3,588,823 | 6/1971 | Chow et al. | 382/37 X |
| 3,824,387 | 7/1974 | Garst | 364/179 |
| 3,950,733 | 4/1976 | Cooper et al. | 364/900 |
| 4,499,596 | 2/1985 | Casey et al. | 382/37 |
| 4,551,850 | 11/1985 | Werth et al. | 382/37 X |
| 4,599,692 | 7/1986 | Tan et al. | 364/900 X |
| 4,606,069 | 8/1986 | Johnsen | 382/34 X |
| 4,635,182 | 1/1987 | Hintz | 364/179 X |
| 4,642,782 | 2/1987 | Kemper et al. | 364/513 X |
| 4,658,370 | 4/1987 | Erman et al. | 364/513 |

OTHER PUBLICATIONS

Sutherland, Jr.—"Variable Sampling Frequency—A New Adaptive Technique"—Control Engineering, Apr. 1973—pp. 33-35.

*Primary Examiner*—Joseph Ruggiero
*Attorney, Agent, or Firm*—C. Lamont Whitham

[57] ABSTRACT

An adaptive mechanism is presented in the context of optimization of expert system applications. Both single and multiple processor implementations are disclosed. The mechanism is used to maintain a near-optimal sequence for scanning rule lists in expert systems. For a program containing a sequential-decision chain with many independent or mutually exclusive outcomes with each decision having associated with it some fixed cost and probability, the adaptive mechanism tends to produce the optimal ordering automatically from repeated observations of the execution of the decision chain.

6 Claims, 6 Drawing Sheets

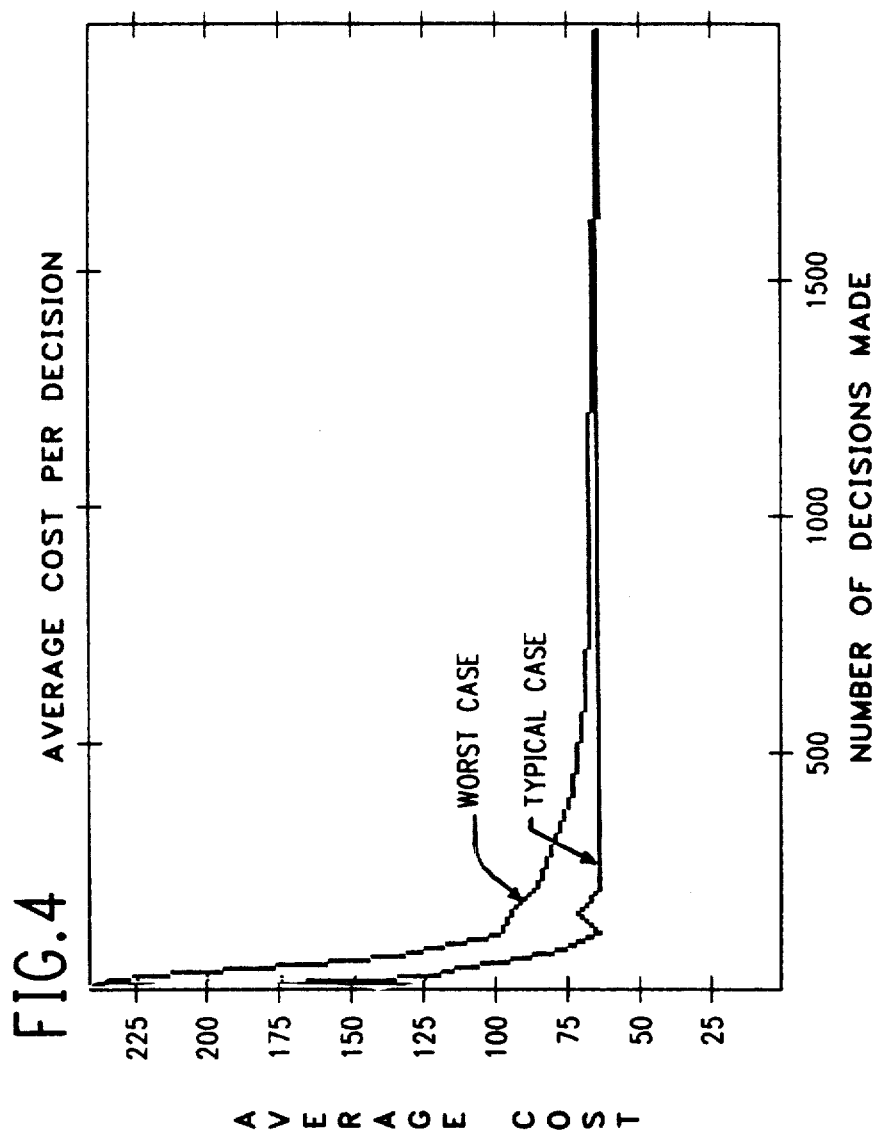

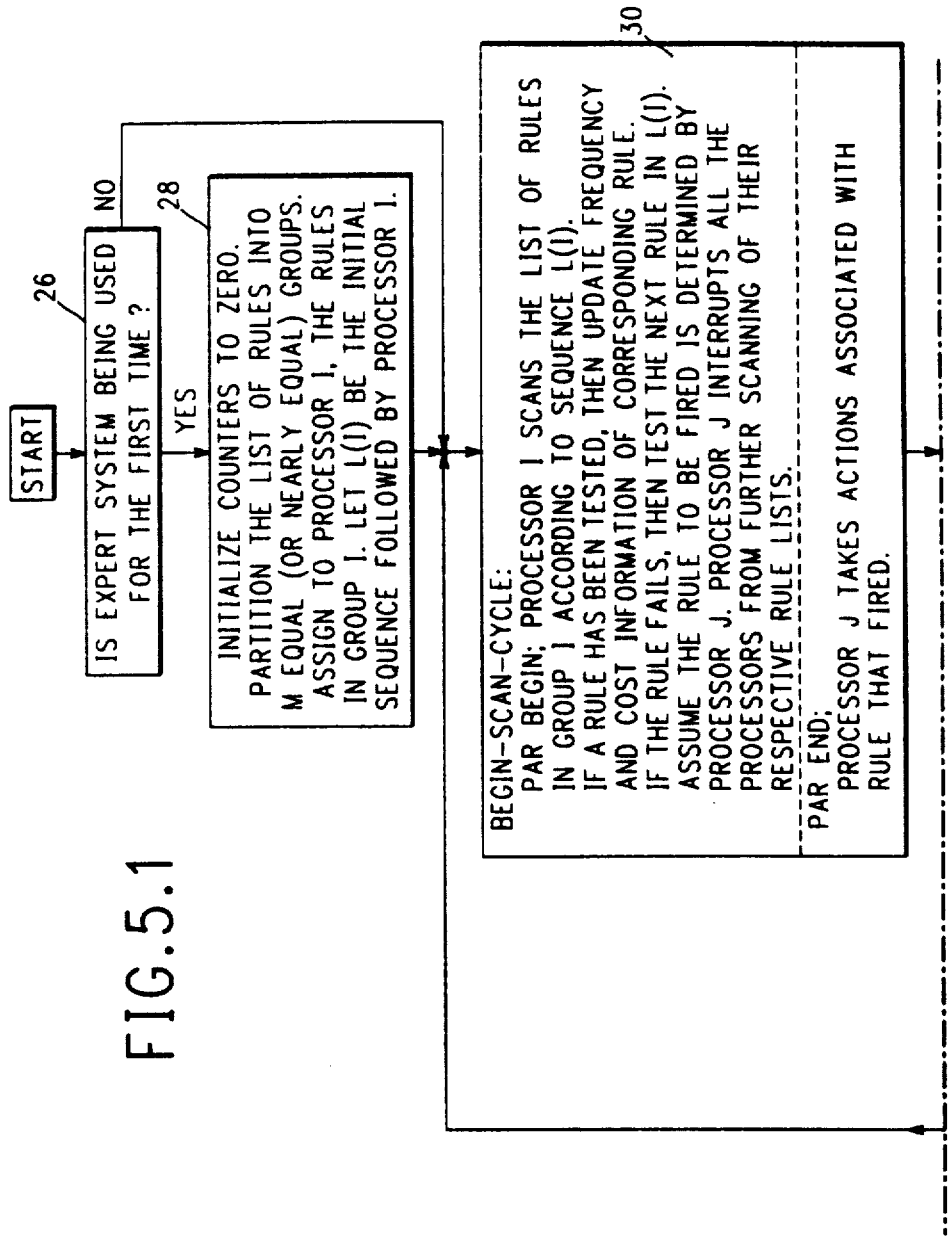
FIG.5.1

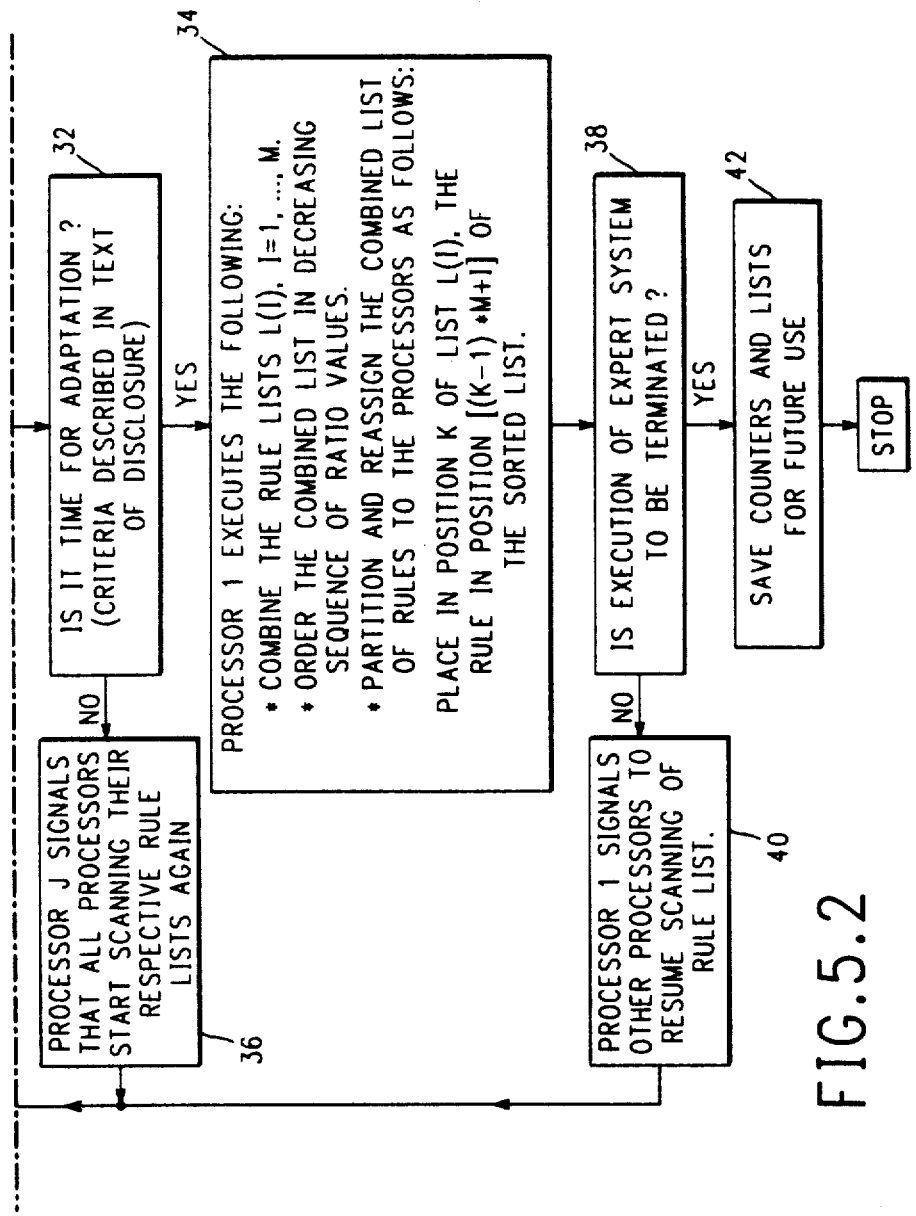
FIG.5.2

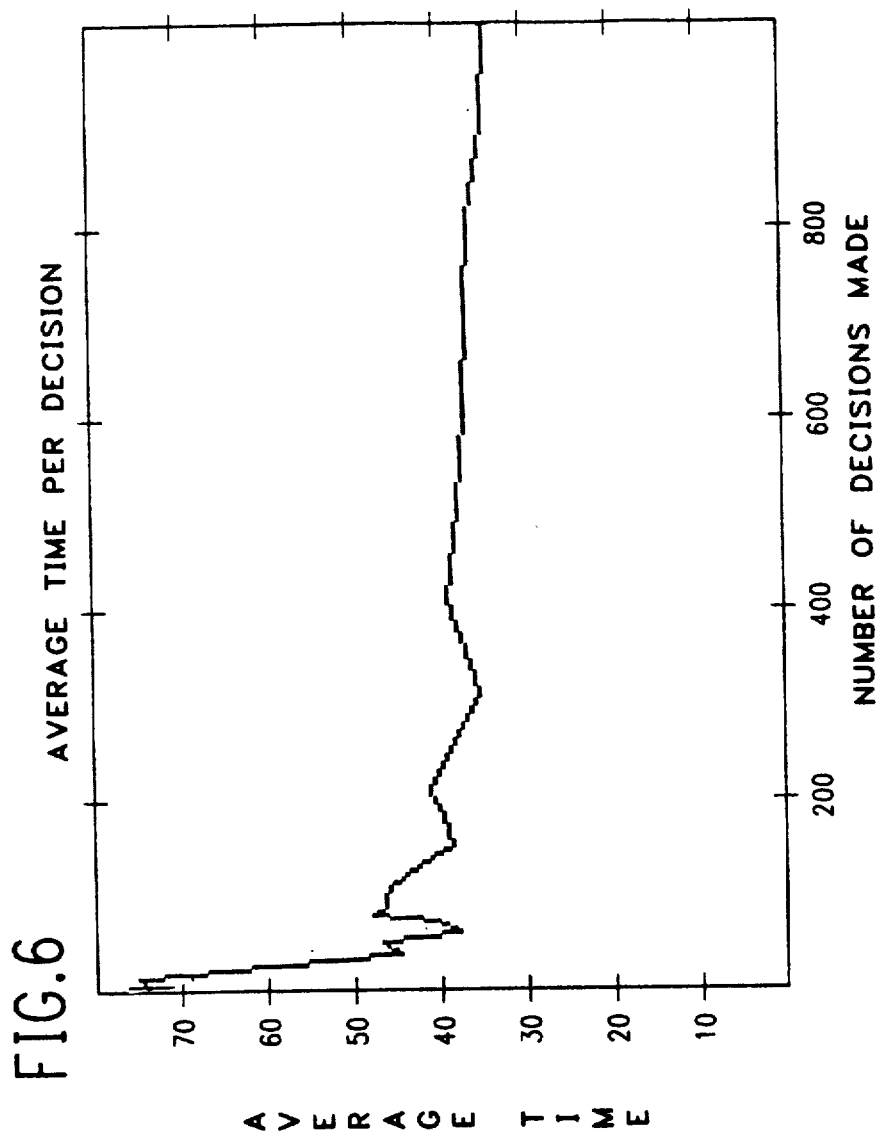

ADAPTIVE MECHANISMS FOR EXECUTION OF SEQUENTIAL DECISIONS

BACKGROUND OF THE INVENTION

1. Field of the Invention

The present invention generally relates to the field of artificial intelligence and, more particularly, to adaptive mechanisms for increasing the speed of execution of sequential decisions. As used herein, artificial intelligence means that part of computer science concerned with designing intelligent computer systems. Such systems are finding increasing application in problem-solving, logical reasoning, language understanding, programming, learning, expert systems, robotics and vision.

2. Description of the Prior Art

Among the most important aspects to problem-solving methods in artificial intelligence are (1) representation and (2) search. The present invention is concerned with the efficiency of search in the decision making process. Search strategies in current practice typically have the following characteristics:

1. they use fixed control;
2. they are insensitive to experience; and
3. they do not exploit the usage pattern of the search program.

Search strategies that use fixed control are inherently limited in achieving good run-time performance. A fixed search stategy is illustrated here by way of an example of pathfinding in a graph. Consider a directed graph (digraph for short) such as the one shown in FIG. 1 of the drawings. A program may be written in PROLOG to search for paths between specified pairs of nodes in the digraph. PROLOG is a computer program language which derives its name from PROgramming in LOGic and is a major artificial intelligence implementation language. See, for example, D. H. D. Warren, L. M. Pereira and F. Pereira, "PROLOG—The Language and Its Implementation Compared with LISP", *Proceedings of the Symposium on Artificial Intelligence and Programming Languages* (1977), published by the ACM. An example of such a program is shown below.

```
adj(a,b).
adj(a,c).
adj(a,d).
adj(a,e).
adj(b,c).
adj(b,d).
adj(c,d).
adj(e,f).
conn(X,Y)<-ne(X,Y)&adj(X,Y).
conn(X,Y)<-ne(X,Y)&adj(X,Z)&conn(Z,Y).
conn(X,Y)<-fail.
```

Suppose a top-down, left-to-right search strategy (i.e., depth-first search) with backtracking is used as provided by a Prolog system. Suppose the search program is queried whether a is connected to f by typing "<-conn(a,f).". Then, execution of the search will involve the traversal of the search tree shown in FIG. 2(a) before a path is found from a to f. The sequence of nodes visited in the search process is shown by a dashed line in the forward direction and by a dotted line in the reverse direction. Each query of the form "<-conn(a,f)." represents an instance of the set of problem inputs that may be presented to the search program. For an instance I of the problem, let the search tree traversed be denoted as T(I). The main characteristic to observe with regard to a fixed search strategy is the following. If the search program were given a repetitive sequence of problem instances of the form I,I,I, . . . ,I (sequence of n I's), then the search trees traversed in the repetitive solution of the problem instances will be T(I),T(I),T(I), . . . ,T(I) (sequence of n T(I)'s).

With respect to I, if the search program were inefficient to begin with, then no matter how many times I is solved, the search program will be exactly as inefficient as it were before it solved the first instance of I. The search program using fixed control does not learn to improve its efficiency to take advantage of the fact that, in its experience, it has solved certain problem instances more frequently than certain other problem instances. We believe that for realistic problems, not all input instances are equally likely to occur. Assuming the set of problem instances encountered exhibit a nonuniform distribution, this can be exploited by search programs to optimize their average run-time performance.

A significant disadvantage of a fixed search strategy, such as the depth-first search provided by PROLOG, is that a programmer has to be aware of the fixed order in which the search will be conducted for various inputs. If the programmer is concerned with efficiency, then he is responsible for writing the program in such a way that the fixed search strategy will find solutions efficiently for the set of problem instances he wishes to solve. For instance, suppose the pathfinding program is predominately used for finding a path from a to f and rather infrequently used for finding paths between other pairs of nodes. Then, a good strategy for improving performance is to write the program such that the search involved in finding a path from a to f is made as efficient as possible even at the expense of increasing the search effort for finding paths between some other pairs of nodes. Knowing that PROLOG uses a fixed depth-first search strategy, the programmer could achieve the desired objective by simply rewriting the pathfinding program as follows:

```
adj(a,e).
adj(a,c).
adj(a,d).
adj(a,b).
adj(b,c).
adj(b,d).
adj(c,d).
adj(e,f).
conn(X,Y)<-ne(X,Y)&adj(X,Y).
conn(X,Y)<-ne(X,Y)&adj(X,Z)&conn(Z,Y).
conn(X,Y)<-fail.
```

The search tree traversed in finding a path from a to f is as shown in FIG. 2(b), and the search effort involved is efficient. The average performance can thus be improved.

In general, the task of organizing the program for efficient execution by a fixed search strategy is complicated for two reasons. First, for moderate to large-sized search programs, understanding the structure of search trees traversed for different problem instances soon becomes difficult. Second, and more important, the programmer typically would have no a priori knowledge of the workload; i.e., the relative frequencies with which different problem instances will be submitted to the program over the program's lifetime. The programmer will typically have knowledge only of what constitutes valid problem inputs. These drawbacks are intrinsic in the nature of any fixed search strategy. The subject invention is directed to approaches which overcome the limitations of a fixed search strategy.

In the prior art, U.S. Pat. No. 4,368,509 to Li discusses mechanisms for adaptive self-optimization. Li's patent is based on an algorithm that discovers dependencies among variables. His algorithm generates a sequence of tests that adaptively discovers the dependencies. Li's technique allows the algorithm to produce a set of test inputs on which observations are made. Then, according to a particular mathematical strategy, a new set of inputs is generated. However, for the same set of inputs submitted at different instants in time, the system is controlled in an identical manner resulting in exactly identical performance.

As will become clear from the description which follows, Li's patent differs from our invention in a very fundamental manner. The key characteristics of our invention are adaptive learning and capability for self-improvement of efficiency of systems embodied with our invention. This is achieved by keeping a prior history of search performance. If a sequence of identical problem inputs were submitted to a system embodied with our invention, the efficiency with which the problem instance is solved can vary from one instance of the problem to the next in a way that tends to minimize the search effort involved in solving the problem. This is achieved by the adaptive learning mechanisms of the present invention. In contrast, Li's patent does not possess the unique characteristic of the invention, namely, adaptively learning to improve efficiency in a systematic manner so that frequently encountered classes of problem instances are solved with improved efficiency as the system is used on a repeated basis.

U.S. Pat. No. 4,472,770 to Li is more general than the above-referenced patent to Li; however, the comments given above apply to this patent as well.

U.S. Pat. No. 4,210,962 to Marsh et al provides a demonstration that dynamic programming problems can be solved rapidly enough for use in real-time applications. Marsh et al describe a special purpose parallel computer to speed up the solution of dynamic programming problems. The parameters of the dynamic programming problem are supplied as inputs to the dynamic programming processor. The main issue addressed by this patent is fast computation of the optimal solution to problems. There is no learning and adaptation involved. The efficiency with which an instance of a dynamic programming problem is solved does not depend on history; i.e., how often the problem instance was solved before by the processor disclosed in the patent. Thus, there is a fundamental difference between the Marsh et al patent and our invention which always tends to bias the system toward the efficient solution of frequenty encountered problem instances.

U.S. Pat. No. 4,499,596 to Casey et al discloses the idea of adapting a system in a manner that is influenced by the sequence of inputs presented to the system. Casey et al describe the logic of an algorithm that has been used for efficient classification of characters in the context of optical character recognition systems. The process of classification is then used to generate compact coded vector representation of scanned characters. This can result in reduced storage and transmission requirements for facsimile application. The objectives of the Casey et al patent do not include optimization of classification time or storage requirements. Casey et al's scheme adapts in the sense that it is able to receive an arbitrary sequence of text characters, one at a time. Each character that is encountered for the first time is automatically assigned a class index. Any subsequent encounter of the same character will result in retrieval of the class index of the character for output. Thus, adaptation in the context of the Casey et al patent means ability to classify character strings that are seen by the system for the first time. It should be noted that the purpose of adaptation is not optimization of any specified objective function, such as classification time. The method of adaptation described in the Casey et al patent is based on appropriately extending a decision tree network representation whenever a new character is encountered. It is of a heuristic nature. The decision tree representation generated by the algorithm is one of many possible decision trees that may be used to classify characters. There is no formal theoretical basis provided for choosing among the many possible representations. There is no concept of learning in the Casey et al patent. Given identical character sequences at different time instants, the classification algorithm always executes identical steps and requires the same amount of time and storage for execution. The efficiency of the algorithm for solving a problem instance does not depend on whether the problem instance was solved previously. Thus, there is fundamental difference between the Casey et al patent and our invention.

SUMMARY OF THE INVENTION

It is therefore an object of the present invention to provide adaptive mechanisms for the faster execution of sequential decisions.

It is a further object of the subject invention to provide an adaptive-learning mechanism for improving the performance of applications that require sequential-decision making.

It is another object of the invention to provide adaptive mechanisms for increasing the speed of execution of sequential decisions using a parallel computer.

It is yet another object of the instant invention to provide an adaptive mechanism which enables multiple processors to learn, adapt, and cooperate in an effective way to speed up the execution of such applications.

According to the invention, an adaptive mechanism is provided which reorders a chain of decisions based on observations made during their execution in order to produce an ordering that achieves faster execution. Eventually, the average performance over a period of time converges to the optimum performance. The algorithm is used to maintain a near-optimal sequence for trying the set of alternatives. It is assumed that the costs (for success and failure) and probabilities for the different alternatives are not known when the program is written, so that the programmer cannot determine the optimal ordering from a prior knowledge. When the search program is presented a sequence of problem instances to solve, it follows the initial ordering of the search tree. As it solves these problem instances, it also monitors the amount of search effort (CPU time or number of instructions or some other dominant measure) it spends in trying the different alternatives. The information it gathers from repeated observations of the execution of the search program is used to produce automatically a near-optimal ordering of the alternatives.

Typical of the applications where this mechanism can be effectively used are certain kinds of expert systems and fault diagnosis systems. An expert system often requires that a list of rules be scanned. As soon as an applicable rule is found, the rule is fired and the scanning of the list of rules is repeated. Associated with each rule are a cost (e.g., number of instructions or execution time) of deciding whether the rule is applicable and a probability with which the rule will fire. Certain fault diagnosis and isolation systems require the execution of a decision chain for selecting one out of N possible outcomes that result in follow-up actions such as module replacement or detailed testing of specific modules. The diagnosis system applies a sequence of test procedures to a faulty machine until one procedure terminates with a positive finding. Each test takes a certain amount of time and is likely to turn up a positive result with a certain probability.

The adaptive mechanism according to this invention is presented in the context of optimization of expert-system applications. The mechanism is used to maintain a near-optimal sequence for scanning rule-lists in expert systems. Assume, for example, that a program contains a sequential decision chain with either mutually exclusive or independent outcomes, and that each decision in the chain has associated with it some fixed cost and probability. It is well known that the optimal ordering of the decisions orders them by descending values of the ratios of their probabilities to their costs. See, for example, W. E. Smith, "Various Optimizers for Single-Stage Production", *Naval Research Logistics Quarterly*, 3(1956), pp. 59–66, and H. A. Simon and J. B. Kadane, "Optimal Problem-Solving Search: All-or- None Solutions", *Artificial intelligence*, 6(3), 1975, pp. 235–247.

In its most basic form, the adaptive mechanisms according to the invention are applied to a single processor system. In a sequel, the invention is described in the context of two processors which cooperate and maintain a near optimal sequence for scanning rule-lists in expert systems. These basic mechanisms can be extended to parallel computers with more than two processors.

BRIEF DESCRIPTION OF THE DRAWINGS

The foregoing and other objects, aspects and advantages of the invention will be better understood from the following detailed description of preferred embodiments of the invention with reference to the drawings, in which:

FIG. 4 is a graph showing the results of applying the adaptive mechanism of the invention implemented in a single processor to a decision chain with seven decisions;

FIGS. 5.1 and 5.2, taken together, are a flow chart of adaptive mechanism as implemented on plural processors; and FIG. 6 is a graph showing the results of applying the adaptive mechanism of the invention implemented on two processors to a decision chain with thirteen decisions.

DETAILED DESCRIPTION OF PREFERRED EMBODIMENTS OF THE INVENTION

Before describing the first embodiment of the invention as it would be implemented on a single processor, it is necessary to first define certain variables. Let N be the total number of rules in a list scanned by an expert system. Let the observed frequencies of firing of different rules be stored in a 1-dimensional array FREQ, with FREQ(i), i=1, ... ,N, containing the total number of times Rule i has fired. When the expert system is used for the very first time, the FREQ values are set to zero. Let COST be a 1-dimensional array such that COST(i), i=1, ... ,N, contains the accumulated cost of testing if Rule i is applicable. Let ATTEMPTS be a 1-dimensional array such that ATTEMPTS(i), i=1, ... ,N, contains the number of times a rule has been tested for firing. Then the average cumulative cost for Rule i is COST(i)/ATTEMPTS(i). Let RATIO be a 1-dimensional array such that RATIO(i), i=1, ... ,N, contains the value $$\frac{FREQ(i)/ATTEMPTS(i)}{COST(i)}$$

This is an estimate of the ratio of probability of firing to cost per test for each rule.

Figure 1:
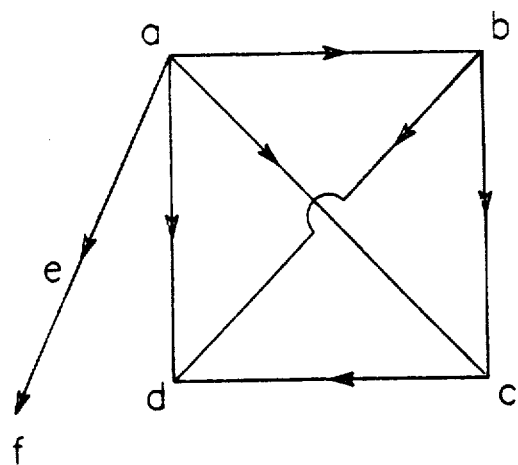
FIG. 1 is a graphical representation of a directed graph or digraph.
Figure 2A:
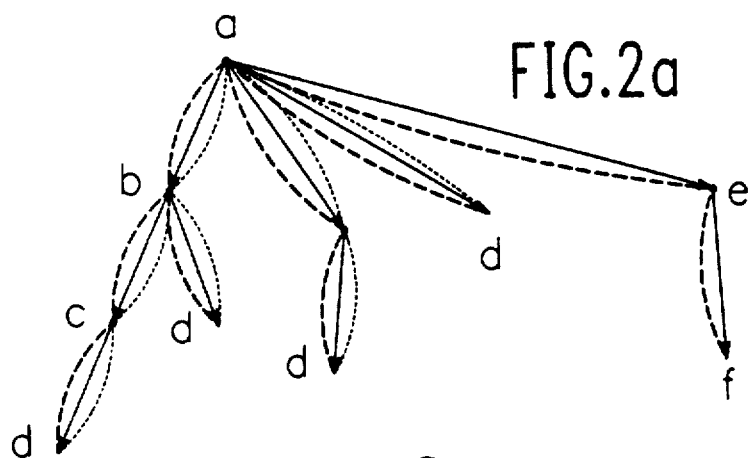
FIGS. 2(a) and 2(b) are graphical representations of search trees.
Figure 2B:
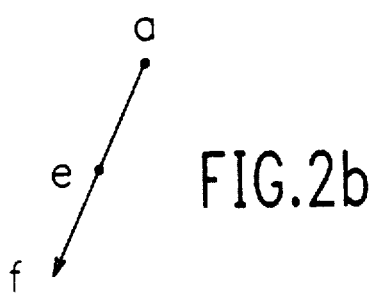
Figure 3:
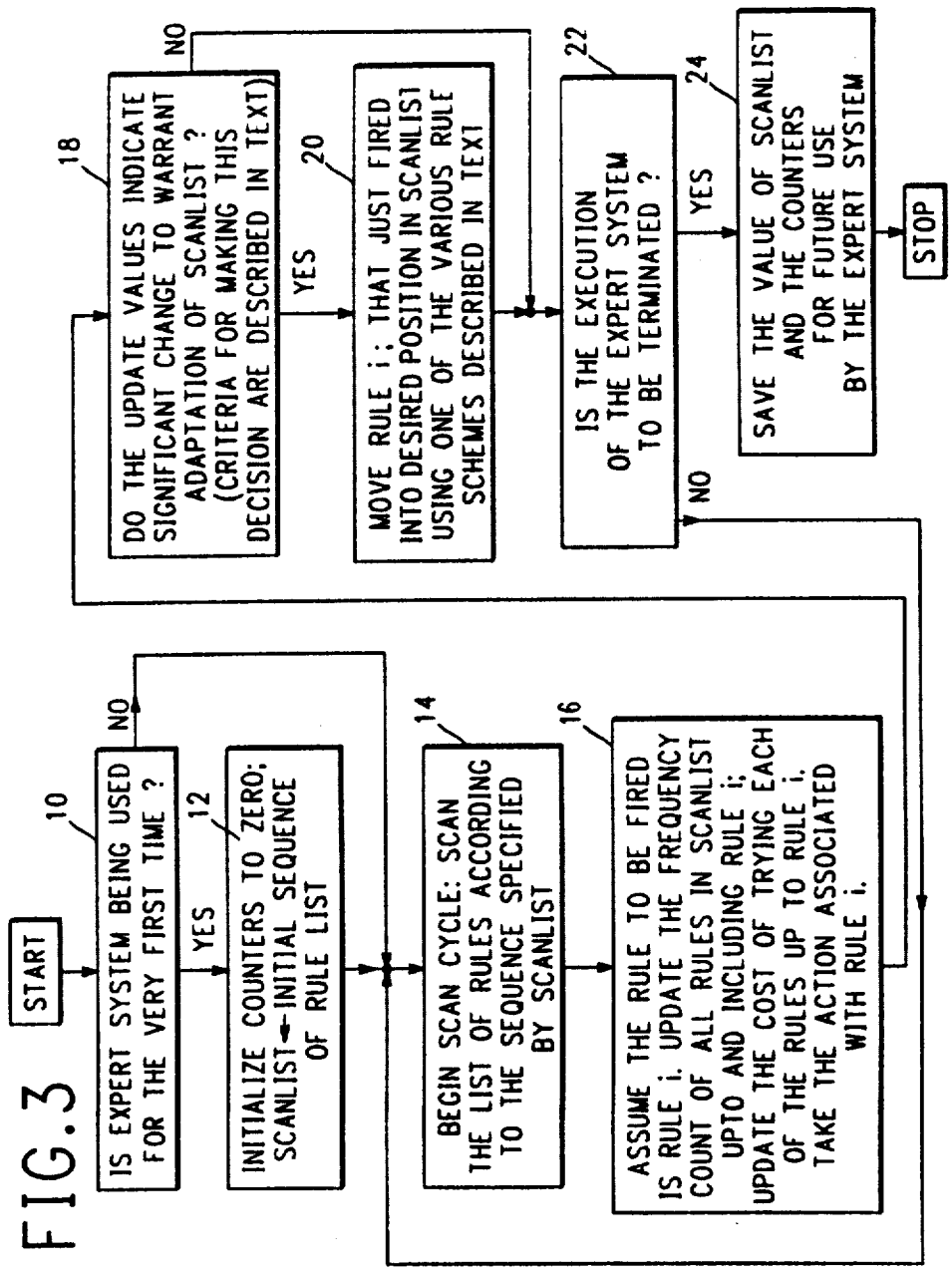
FIG. 3 is a flow chart of the adaptive mechanism as implemented in a single processor.

Referring now to the drawings, and more particularly to FIG. 3, the adaptive mechanism according to the invention executes the following procedure. The first test made in decision block 10 is to determine if the expert system is being used for the very first time. If so, as indicated in function block 12, the counters used to count the variables are initialized to zero and the SCANLIST is set to the initial sequence of the rule list. A list of rules is maintained in sequence, and the rules are ordered by nonincreasing RATIO values. This list is called the SCANLIST. If, on the other hand, the expert system is not being used for the very first time, the initialization of function block 12 is skipped, and control goes directly to function block 14 where the scan cycle begins. Whenever a rule has to be chosen for firing, the rules are selected in order from SCANLIST, so that Rule i is tested before Rule j if RATIO(i) >RATIO(j). When a rule, say Rule k, is tested for firing, the following actions are taken. ATTEMPTS(k) is incremented by 1, and COST(k) is increased by the cost of the testing. When a test for Rule k is successful, indicating that the rule will fire, FREQ(k) is increased by 1, and RATIO(k) is updated. This is indicated in function block 16. Then a test is made in decision block 18 to determine if the updated values indicate a significant change that warrants adaptation of SCANLIST. If the test is positive, Rule k is reordered in SCANLIST in function block 20 to maintain the ordering to be nonincreasing by RATIO values; otherwise, function block 20 is skipped and control is passed to decision block 22 which determines if the execution of the expert system is to be terminated. If not, the process loops back to function block 14. However, if the execution of the expert system is to be terminated, then control passes to function block 24 where the values of SCANLIST, COST, FREQ, ATTEMPTS, and RATIO are saved for future use by the expert system. The appendix contains a program listing in the PL/1 programming language which simulates the procedures illustrated in the FIG. 3 flow chart.

The expected cost of firing a rule with the adaptive mechanism according to the invention typically converges to a near-optimal cost after a number of rules have been fired. FIG. 4 shows the adaptive mechanism applied to a decision chain with seven decisions. The higher graph shows the convergence when the chain has been deliberately placed in the worst possible initial ordering. The lower graph shows the convergence for an initial ordering chosen at random. The optimal cost for these data is 62.6, and both examples achieve near-optimal performance within 500 decisions, with the random initial ordering actually converging within 200 decisions. The observed improvement in average cost of testing for these two examples varied between three and four to one. The improvement and convergence rates observed are problem dependent and, therefore, do not necessarily reflect which might be observed in practice.

There are several variations of the basic idea that achieve nearly the same performance improvement at lower overhead costs for the mechanism. Since the majority of the performance improvement occurs in the first few hundred decisions, the reordering of the rules can be done with varying frequency, occurring for almost every decision at first, and eventually being done rather rarely. It is possible to change the order of only the rules that fire successfully, or to reorder all rules including those that did not fire, when a reordering occurs. Because the cost of execution of a test may not vary significantly each time the test is performed, it may not be necessary to maintain both COST and ATTEMPTS. Instead, each rule may be associated with a fixed constant cost per test, so that it is sufficient to have COST(i) for each Rule i, with the initial value of COST(i) determined by counting instructions in the test or from the first execution of the test. In this case, the computation of RATIO(i) reduces to computing the value FREQ(i)/COST(i). Another simplification is possible in considering rule reordering. When a ratio changes sufficiently for its corresponding rule to be moved elsewhere in the decision chain, instead of moving that rule to its designated position, it is simpler to swap the rule with the neighboring rule in the direction that the rule should move. Convergence may be slower with this scheme, but the lower overhead may yield better overall performance.

Consider next the application of the invention to a multi-processor system as represented by M processors. Again, it is necessary to define variables. Let ADAPT_INTERVAL be a variable containing the frequency with which the M processors will cooperate in sharing their knowledge. The value of this variable is initially set to unity when the multiprocessor algorithm is used for the first time. Let COUNT be a variable for counting the number of rules that have fired. When the multiprocessor algorithm is first used, COUNT is initialized to zero.

As shown in the flow chart of FIG. 5, the multiprocessor system executes the following procedure. As in the single processor implementation, the first decision that must be made, by processor P1, is whether this is the first time the expert system is being used, as indicated in decision block 26. If it is, the list of rules is partitioned into M sublists L1, L1, ..., LM of equal (or nearly equal) size in function block 28. On the other hand, if the expert system is not being used for the first time, then function block 28 is skipped and control is passed to function block 30 where the scan cycle begins.

Processor Pi (i=1,2, ...,M) keeps the list of rules in Li, ordering them by nonincreasing RATIO values. Whenever a rule has to be chosen for firing, Pi considers rules in the order in which they appear in Li. Processor Pi will consider Rule k for firing before Rule 1 if RATIO(k) >RATIO(1), assuming both Rules k and 1 are in Li. When a rule, say Rule k, has been tested by Pi for firing, the following actions are taken. ATTEMPTS(k) is incremented by 1, and COST(k) is increased by the cost of the testing. When one of the processors, say Pj, finds a rule, say Rule k, that can fire, then the following additional actions are taken by Pj. COUNT is incremented by 1. FREQ(k) is incremented by 1 and RATIO(k) is updated. Then Rule k is reordered in list Lj to maintain the ordering to be nonincreasing RATIO values. As soon as Rule k fires, Pj also notifies all the other processors through an interrupt mechanism to stop further processing of their respective lists.

The M processors cooperate as follows in sharing the knowledge they have gained from observations. A test is made in decision block 32 by processor Pj, that just fired a rule, to determine if it is time for adaptation. If COUNT equals ADAPT_INTERVAL, control is transferred by Pj to P1 to carry out the adaptation process. Processor P1 resets COUNT to 0 and takes the following actions in function block 34. It combines the rules contained in L1, L2, ..., LM and orders the combined list of rules in nonincreasing order of their RATIO values. This list is called the MASTER_LIST. P1 reassigns rules to L1, L2, ..., LM as follows. A rule is placed in position k of list Li if it occurs in position {(k−1)M+i} of MASTER_LIST. If, on the other hand, it is not time for adaptation, control passes to function block 36 where the processor Pj, that just fired a rule in block 30, signals the start of scanning of respective rule lists again, and control loops back to function block 30.

After function block 34, a test is made in decision block 38 by processor P1 to determine if the execution of the expert system is to be terminated. If not, control passes to function block 40 were processor P1 signals the resumption of scanning of the rule lists, and control loops back to function block 30. If, on the other hand, execution is to be terminated, control passes to function block 42 where the contents of the counters are saved along with the current ordering of the lists for future use.

The appendix contains a program listing in the PL/I programming language which simulates a special case of the above descirbed multiprocessor procedures, namely, for implementation on a two-processor system. With a two-processor implementation, the expected cost of firing a rule with the multiprocessor procedure typically converges to a value somewhat greater than half the optimal cost achievable with a single processor. The observed speedup in simulation study of the multiprocessor procedure varied between 1.43 and 1.85. FIG. 6 shows the multiprocessor procedure applied to a decision chain with thirteen decisions. The graph shows the convergence for an initial ordering chosen at random. The observed improvement in the cost of testing in this example was 2.3 Convergence occured within 1000 decisions at a cost of 33.7. For the data used in this example, the optimal cost of testing with one processor is 48.2. The observed speedup is thus 1.43. Performance improvement relative to initial ordering, convergence rates and speedup factors observed are problem dependent and, therefore, do not necessarily reflect which might be observed in practice.

There are several variations of the basic multiprocessor mechanism that may achieve nearly the same performance improvement at lower overhead costs for the mechanism. Again, since the majority of the performance improvement occurs in the first few hundred decisions, the multiprocessors may be made to cooperate very frequently at first, and eventually very rarely. This could be accomplished by executing the multiprocessor algorithm initially with ADAPT_INTERVAL set to unity and then resetting ADAPT_INTERVAL to a larger value. Further, instead of partitioning the decision chain into M sublists that are considered exclusively by the M processors each time the rule list is scanned in parallel, a common list consisting of all the decisions in the chain can be maintained in nonincreasing order of RATIO values. Rules can be tested according to the sequence in the common list. Whenever a processor becomes available, it can choose the next rule in the list which has not yet been tested in the current scan cycle. As soon as a rule has been tested successfully for firing by one processor, it can stop the current scan cycle and also interrupt the other processors to stop further processing. This scheme may have comparable convergence and overall performance as the basic multiprocessor scheme.

While the invention has been described in terms of two specific implementations, one on a single processor and one on a multiprocessor system, it will be understood by those skilled in the art that the invention can be practiced in various alternatives and with various modifications within the scope and spirit of the invention as defined in the appended claims.

YO985-081

20

APPENDIX

SOURCE LISTING
SINGLE PROCESSOR SIMULATION

```
IDENTIF: PROCEDURE OPTIONS(MAIN);

/* THIS PROGRAM IS A SIMULATION OF AN ADAPTIVE RULE REORDERING */
/* SCHEME. THE DISCLOSURE DESCRIBES A GENERAL FRAMEWORK FOR    */

/* ACHIEVING OPTIMAL RULE ORDERING TO ACHIEVE OPTIMAL EXECUTION*/
/* TIME PERFORMANCE. THIS PROGRAM SHOWS THE SIMULATION OF A    */
/* SPECIFIC INSTANCE OF THIS GENERAL FRAMEWORK. IN THE DESIGN  */
/* OF AN EXPERT SYSTEM, EITHER THIS OR ONE OF THE VARIATIONS   */
/* OF THE GENERAL FRAMEWORK CAN BE EMBEDDED AND THE EXECUTION  */
/* TIME PERFORMANCE IMPROVED AT LITTLE OVERHEAD TO THE SYSTEM. */

DCL N FIXED,          /* NO. OF OBJECT TYPES, MAX. VALUE OF 20 */
    COST(20) FLOAT,   /* COST OF IDENTIFYING OBJECTS           */
    PROB(20) FLOAT,   /* PROB. OF OCCURRENCE OF OBJECT TYPES   */
    FREQ(20) FIXED BIN(31), /* OBSERVED FREQUENCY OF OBJECTS   */
    RANK(20) FIXED;   /* PREFERRED DECISION CHAIN SEQUENCE     */
    DCL (ORDER(20),OBJTYPE(100),IND) FIXED;
    DCL SAVECOST(20) FLOAT;
    DCL (TOTALFREQ,TOTAL_DIAG_COST,ICNT) FIXED BIN(31);
    DCL RSTABLE(20) FIXED, (DCOST,EXPCOST,RATIO(20)) FLOAT;
  DCL TOTALITEMS FIXED BIN(31); /* NO. OF OBJECTS TO BE IDENTIFIED */
  DCL( IX,IY) FLOAT DEC(16), YFL FLOAT DEC (16);/* GLOBAL VARIABLES */
  DCL (RESULT) FLOAT;                        /* FOR RANDGEN           */
  DCL(I,J,ITEMP,PNTLOOP)FIXED BIN, (X1,X2,RTEMP) FLOAT;
    PUT LIST(' SPECIFY NUMBER OF OBJECT TYPES :'); GET LIST(N);
    PUT LIST(' SPECIFY (COST,PROBABILITY IN %) FOR EACH OBJECT');
    ICNT=0;
    DO I=1 TO N;
      GET LIST(COST(I),PROB(I));
      ORDER(I)=I;
      SAVECOST(I)=COST(I);
      DO J=1 TO PROB(I);
        ICNT=ICNT+1;
        OBJTYPE(ICNT)=I;
      END;
    END;
/* COMPUTE THE MINIMUM EXPECTED COST OF IDENTIFICATION          */
/* FIRST WE FIND THE RATIO STABLE SEQUENCE USING THE GIVEN      */
/* VALUES OF COST AND PROBABILITY                               */
    DO I=1 TO N;
      RSTABLE(I)=I;
      RATIO(I)=PROB(I)/COST(I);
    END;
```

```
    CALL SORT(RATIO,RSTABLE,N);

/* INITIAL DECISION SEQUENCE AT THE START OF ADAPTIVE PROCEDURE  */
/* IS THE REVERSE OF THE RATIO STABLE SEQUENCE (I.E. WORST-CASE) */
/* CALL SORT(COST,ORDER,N)   */

DCOST=COST(RSTABLE(1));
    EXPCOST=(PROB(RSTABLE(1))/100.0)*DCOST;
    DO I=2 TO N;
      DCOST=DCOST+COST(RSTABLE(I));
      EXPCOST=EXPCOST+(PROB(RSTABLE(I))/100.0)*DCOST;
    END;
    PUT SKIP DATA(EXPCOST);
    CALL SORT (COST,ORDER,N);
PUT LIST(' NO. OF UNKNOWN ITEMS TO BE DIAGNOSED:' ,TOTALITEMS);
    GET LIST(TOTALITEMS);
    PUT LIST(' SPECIFY RANDOM NO. SEED');
    GET LIST(IX);
/* BEGIN THE PROCESS OF SIMULATING THE IDENTIFICATION OF */
/* UNKNOWN OBJECTS                                        */
/* INITIALIZE THE FREQUENCY COUNT  */
    DO I=1 TO N;
      FREQ(I)=1;
    END;
    TOTALFREQ=N;
    TOTAL_DIAG_COST=0;
 /* MAIN LOOP TO SIMULATE ADAPTIVE IDENTIFICATION PROCESS */
    DO I= 1 TO TOTALITEMS;
    IF(MOD(I,1000)=0)
        THEN DO;  DO PNTLOOP=1 TO N;
                    PUT SKIP DATA(COST(PNTLOOP),ORDER(PNTLOOP));
                  END;
                  PUT DATA(I,TOTAL_DIAG_COST);
                  DO PNTLOOP=1 TO N;
                    PUT SKIP DATA(FREQ(PNTLOOP));
                  END;
             END.
    TOTALFREQ=TOTALFREQ+1;
        CALL RANDOM;
        IND=YFL/.01+1; IND=OBJTYPE(IND);
 /* SEARCH FOR THE UNKNOWN OBJECT BY FOLLOWING THE DECISION CHAIN */
    DO J= 1 TO N;
       TOTAL_DIAG_COST=TOTAL_DIAG_COST+COST(J);
       IF(IND=ORDER(J))
         THEN DO; FREQ(IND)=FREQ(IND)+1;
                  IF (J=1) THEN GOTO OUT;
                     ELSE DO;
                              X1=FREQ(ORDER(J-1))/COST(J-1);
                              X2=FREQ(ORDER(J))/COST(J);
                              IF (X1<X2)   /* SWAP ADJACENT ELEMENTS */
                                           /* IN DECISION CHAIN      */
                                 THEN DO;
                                          RTEMP=COST(J);
                                          COST(J)=COST(J-1);
                                          COST(J-1)=RTEMP;
                                          ITEMP=ORDER(J);
                                          ORDER(J)=ORDER(J-1);
                                          ORDER(J-1)=ITEMP;
                                      END;
                                 GOTO OUT;
                          END;
              END;
          END;/* OF LOOP J  */
OUT:    END ;
        PUT LIST(TOTAL_DIAG_COST);
/*****************************************************/
 RANDOM: PROCEDURE;
         IY=MOD(IX*16807,2147483647);
         YFL=IY/2147483647;
         IX=IY;
    RETURN;
  END;   /*   OF PROCEDURE RANDOM  */
/*****************************************************/
 SORT: PROCEDURE(ARRAY,ORDER,N);
       /* SORTS ITEMS IN DESCENDING ORDER USING BUBBLE SORT */
       DCL BOUND FIXED BIN.
```

```
                 (ARRAY(*),TEMP) FLOAT, (ORDER(*),N,ITEMP) FIXED;
      DCL (J,T) FIXED BIN;
      BOUND=N;     /* ARRAY SIZE */
   PUT SKIP LIST(' ENTERING SORT');
      T=0;
  B2:  DO J=1 TO BOUND-1;
           IF ARRAY(J) < ARRAY(J+1)
               THEN DO; TEMP= ARRAY(J);      /* SWAP */
                        ARRAY(J)=ARRAY(J+1);
                        ARRAY(J+1)=TEMP;
                        ITEMP=ORDER(J);
                        ORDER(J)=ORDER(J+1);
                        ORDER(J+1)=ITEMP;
                        T=J;
                    END;
         END;
          IF (T=0) THEN   DO; PUT LIST(' RETURNING'); RETURN; END;
                 ELSE DO;  BOUND = T;   T=0;
                           GOTO B2;
                       END;
       RETURN;
    END;  /* OF PROCEDURE SORT  */
 END;   /* OF MAIN PROCEDURE */
                SOURCE LISTING
              TWO PROCESSOR SIMULATION
  STMT LEV NT
```

```
  1     0    |IDENTIF: PROCEDURE OPTIONS(MAIN);
  2   1 0    | DCL N FIXED,        /* NO. OF OBJECT TYPES, MAX. VALUE OF 20 */
             |     COST(20) FLOAT, /* COST OF IDENTIFYING OBJECTS           */
             |     PROB(20) FLOAT, /* PROB. OF OCCURRENCE OF OBJECT TYPES   */
             |     FREQ(20) FIXED BIN(31), /* OBSERVED FREQUENCY OF OBJECTS */
             |     RANK(20) FIXED;  /* PREFERRED DECISION CHAIN SEQUENCE   */
  3   1 0    |  DCL (ORDER(20),OBJTYPE(100),IND) FIXED;
  4   1 0    |  DCL (TOTALFREQ,TOTAL_DIAG_COST,ICNT) FIXED BIN(31);
  5   1 0    |  DCL RSTABLE(20) FIXED, (DCOST,EXPCOST,RATIO(20)) FLOAT;
  6   1 0    |  DCL TOTALITEMS FIXED BIN(31); /* NO. OF OBJECTS TO BE IDENTIFIED */
  7   1 0    |  DCL( IX,IY) FLOAT DEC(16), YFL FLOAT DEC (16);/* GLOBAL VARIABLES */
  8   1 0    |  DCL (RESULT) FLOAT;                           /* FOR RANDGEN      */
  9   1 0    |  DCL(I,J,ITEMP,PNTLOOP)FIXED BIN, (X1,X2,RTEMP,TEMPCOST) FLOAT;
 10   1 0    |  DCL LOOP FIXED;
 11   1 0    |  DCL TCOST(20) FLOAT,(FLAG,TORDER(20),NQ1,NQ2) FIXED;
 12   1 0    |    PUT LIST(' SPECIFY NUMBER OF OBJECT TYPES :'); GET LIST(N);
 14   1 0    |    PUT LIST(' SPECIFY (COST,PROBABILITY IN %) FOR EACH OBJECT');
 15   1 0    |    ICNT=0;
 16   1 0    |    DO I=1 TO N;
 17   1 1    |       GET LIST(COST(I),PROB(I));
 18   1 1    |       ORDER(I)=I;
 19   1 1    |       DO J=1 TO PROB(I);
 20   1 2    |          ICNT=ICNT+1;
 21   1 2    |          OBJTYPE(ICNT)=I;
 22   1 2    |       END;
 23   1 1    |    END;
             |  /* COMPUTE THE MINIMUM EXPECTED COST OF IDENTIFICATION    */
             |  /* FIRST WE FIND THE RATIO STABLE SEQUENCE USING THE GIVEN */
             |  /* VALUES OF COST AND PROBABILITY                          */
 24   1 0    |    DO I=1 TO N;
 25   1 1    |       RSTABLE(I)=I;
 26   1 1    |       RATIO(I)=PROB(I)/COST(I);
 27   1 1    |    END;
 28   1 0    |    CALL SORT(RATIO,RSTABLE,N);
 29   1 0    |    DCOST=COST(RSTABLE(1));
 30   1 0    |    EXPCOST=(PROB(RSTABLE(1))/100.0)*DCOST;
 31   1 0    |    DO I=2 TO N;
 32   1 1    |       DCOST=DCOST+COST(RSTABLE(I));
 33   1 1    |       EXPCOST=EXPCOST+(PROB(RSTABLE(I))/100.0)*DCOST;
 34   1 1    |    END;
 35   1 0    |    PUT SKIP DATA(EXPCOST);
             |  /* INITIAL DECISION SEQUENCE AT THE START OF SIMULATION OF */
             |  /* DUAL PROCESSOR ALGORITHM IS:                            */
             |  /***********************************************************/
 36   1 0    |    CALL SORT (COST,ORDER,N);
 37   1 0    |    J=0;
 38   1 0    |    DO LOOP=0 TO 1;
 39   1 1    |       DO I=1 TO N;
 40   1 2    |          IF(MOD(I+LOOP,2)=0)
 41   1 3    |            THEN DO; J=J+1;  TCOST(J)=COST(I); TORDER(J)=ORDER(I); END;
 45   1 2    |       END;
```

```
     1  1  |         END;
     1  0  |         DO I=1 TO N;
     1  1  |            COST(I)=TCOST(I);
     1  1  |            ORDER(I)=TORDER(I);
     1  1  |         END;
            |  /************************************/
     1  0  |  PUT LIST(' NO. OF UNKNOWN ITEMS TO BE DIAGNOSED:' ,TOTALITEMS);
     1  0  |       GET LIST(TOTALITEMS);
     1  0  |       PUT LIST(' SPECIFY RANDOM NO. SEED');
     1  0  |       GET LIST(IX);
            |  /* BEGIN THE PROCESS OF SIMULATING THE IDENTIFICATION OF */
            |  /* UNKNOWN OBJECTS                                       */
            |  /* INITIALIZE THE FREQUENCY COUNT */
     1  0  |       DO I=1 TO N;
     1  1  |          FREQ(I)=0;
     1  1  |       END;
     1  0  |       TOTALFREQ=0;
     1  0  |       TOTAL_DIAG_COST=0;
     1  0  |       IF(MOD(N,2)=0) THEN NQ1=N/2;   ELSE NQ1=(N+1)/2;
     1  0  |       NQ2=N-NQ1;
            |  /* MAIN LOOP TO SIMULATE ADAPTIVE IDENTIFICATION PROCESS */
     1  0  |       DO I= 1 TO TOTALITEMS;
     1  1  |          IF(MOD(I,1000)=0)
     1  2  |             THEN DO;  DO PNTLOOP=1 TO N;
     1  3  |                          PUT SKIP DATA(COST(PNTLOOP),ORDER(PNTLOOP));
     1  3  |                       END;
     1  2  |                       PUT DATA(I,TOTAL_DIAG_COST);
     1  2  |                       DO PNTLOOP=1 TO N;
     1  3  |                          PUT SKIP DATA(FREQ(PNTLOOP));
     1  3  |                       END;
     1  2  |             END;
     1  1  |          TOTALFREQ=TOTALFREQ+1;
     1  1  |          CALL RANDOM;
     1  1  |          IND=YFL/.01+1;  IND=OBJTYPE(IND);
            |  /* SEARCH FOR THE UNKNOWN OBJECT BY FOLLOWING THE DECISION CHAIN */
     1  1  |          TEMPCOST=0; FLAG=0;
     1  1  |          DO J=1 TO N;
     1  2  |             IF(J>NQ1 & FLAG=0) THEN DO; TEMPCOST=0; FLAG=1;  END;
     1  2  |             TEMPCOST=TEMPCOST+COST(J);
     1  2  |             IF(IND=ORDER(J))
     1  3  |                THEN DO; FREQ(IND)=FREQ(IND)+1;
     1  3  |                         IF (J=1 | J=NQ1+1) THEN GOTO OUT;
     1  3  |                            ELSE DO;
     1  4  |                                    X1=FREQ(ORDER(J-1))/COST(J-1);
     1  4  |                                    X2=FREQ(ORDER(J))/COST(J);
     1  4  |                                    IF (X1<X2)   /* SWAP ADJACENT ELEMENTS */
            |                                                /* IN DECISION CHAIN     */
            |                                       THEN DO;
     1  5  |                                                RTEMP=COST(J);
     1  5  |                                                COST(J)=COST(J-1);
     1  5  |                                                COST(J-1)=RTEMP;
     1  5  |                                                ITEMP=ORDER(J);
     1  5  |                                                ORDER(J)=ORDER(J-1);
     1  5  |                                                ORDER(J-1)=ITEMP;
     1  5  |                                       END;
     1  4  |                                    GOTO OUT;
     1  4  |                            END;
     1  3  |                END;
     1  2  |          END;   /* OF LOOP J */
     1  1  |  OUT: ;     TOTAL_DIAG_COST=TOTAL_DIAG_COST+TEMPCOST;
            |  /* CHECK IF THE PARTITIONING OF DECISION CHAIN MUST BE    */
            |  /* ADJUSTED.  THIS IS BASED ON OBSERVATIONS REGARDING THE */
            |  /* TWO  HALVES OF THE DECISION CHAIN THAT ARE EXECUTED BY */
            |  /* THE   TWO PROCESSORS                                   */
     1  1  |          IF(MOD(I,100)¬=0)   THEN GOTO OUT2;
     1  1  |          CALL SORT(COST,ORDER,N);
     1  1  |          J=0;
     1  1  |          DO LOOP=0 TO 1;
     1  2  |             DO ICNT=1 TO N;
     1  3  |                IF(MOD(ICNT+LOOP,2)¬=0)
     1  4  |                   THEN DO;  J=J+1;  TCOST(J)=COST(ICNT);
     1  4  |                                    TORDER(J)=ORDER(ICNT);
     1  4  |                   END;
     1  3  |             END;
     1  2  |          END;
     1  1  |          DO ICNT=1 TO N;
     1  2  |             COST(ICNT)=TCOST(ICNT);
     1  2  |             ORDER(ICNT)=TORDER(ICNT);
```

```
               END;
OUT2:          END ;
               PUT LIST(TOTAL_DIAG_COST);
/*****************************************************************/
    RANDOM: PROCEDURE;
               IY=MOD(IX*16807,2147483647);
               YFL=IY/2147483647;
               IX=IY;
            RETURN;
            END;    /*   OF PROCEDURE RANDOM   */
/*****************************************************************/
    SORT: PROCEDURE(ARRAY,ORDER,N);
            /* SORTS ITEMS IN DESCENDING ORDER USING BUBBLE SORT */
            DCL BOUND FIXED BIN,
                (ARRAY(*),TEMP) FLOAT, (ORDER(*),N,ITEMP) FIXED;
            DCL (J,T) FIXED BIN;
            BOUND=N;     /* ARRAY SIZE */
    PUT SKIP LIST('   ENTERING SORT');
            T=0;
    B2:     DO J=1 TO BOUND-1;
               IF ARRAY(J) < ARRAY(J+1)
                  THEN DO; TEMP= ARRAY(J);        /* SWAP */
                           ARRAY(J)=ARRAY(J+1);
                           ARRAY(J+1)=TEMP;
                           ITEMP=ORDER(J);
                           ORDER(J)=ORDER(J+1);
                           ORDER(J+1)=ITEMP;
                           T=J;
                       END;
            END;
            IF (T=0) THEN   DO; PUT LIST(' RETURNING'); RETURN; END;
                     ELSE DO;  BOUND = T;  T=0;
                               GOTO B2;
                           END;
            RETURN;
         END;   /* OF PROCEDURE SORT  */
      END;     /* OF MAIN PROCEDURE   */
```

Having thus described our invention, what we claim new and desire to secure by Letters Patent is as follows:

1. An adaptive mechanism for the optimization of sequential decision making in an artificial intelligence system having N rules in a list to be scanned comprising steps of:

storing the observed frequencies of firing of different rules in a one-dimensional array FREQ, with FREQ(i), i=1, . . . ,N, containing the number of times each rule has fired;

setting the FREQ values to zero the first time said system is used;

generating a one-dimensional array COST(i), i=1, . . . ,N, containing the accumulated cost of testing if a given rule is applicable;

generating a one-dimensional array ATTMEPTS(i), i=1, . . . ,N, containing the number of times a rule has been tested for firing;

generating a one-dimensional array RATIO(i), i=1, . . . ,N, containing the value $$\frac{FREQ(i) ATTEMPTS(i)}{COST(i)}$$

which is the estimate of the ratio of probability of firing to cost per test for each rule;

maintaining a SCANLIST of rules in a sequence ordered by nonincreasing RATIO values;

selecting a rule for firing in order from SCANLIST so that Rule i is tested before Rule j if RATIO(i) > RATIO(j);

incrementing ATTEMPTS(i) and increasing COST(i) by the cost of testing when RULE(i) is tested for firing; and increasing FREQ(i) by one when a test for RULE(i) is successful indicating that a rule will fire and updating RATIO(i).

2. The adaptive mechanism as recited in claim 1 further including the step of reordering SCANLIST to maintain the ordering to be in nonincreasing RATIO values.

3. The adaptive mechanism as recited in claim 2 further including the step of saving SCANLIST, FREQ, COST, ATTEMPTS and RATIO for future use by the system.

4. In an artificial intelligence system, a method of optimization of sequential decision making process comprising the steps of:

monitoring quantifiable performance parameters including probability or equivalent relative frequency of occurrence of different outcomes of a search;

developing a prior history of the monitored quantifiable performance parameters including the cost of the search, where cost is any dominant performance measure of the system such as the number of instructions executed, the number of memory references, the number of machine cycles completed, or elapsed time; and automatically adapting and converging to an optimum average cost of search based on the prior history developed of the monitored quantifiable performance performance parameters.

5. The method of optimization recited in claim 4 wherein the step of automatically adapting and converging to an optimum average cost of search comprises the steps of:

computing ratios of probability or equivalent relative frequency of occurrence to cost for search rules in said sequential decision making process; and ordering a search list of rules in a nonincreasing order of ratios computed for the rules.

6. The method of reducing the overhead of an adaptive algorithm of a sequential decision making process for an artificial intelligence system wherein quantifiable performance parameters are monitored and measured, the sequential decision making process is automatically adapted and converged to an optimum average search cost comprising the steps of:

varying the frequency of the adaptation process to be relatively more frequent initially and less frequent or not at all after the search process reaches near optimal or optimal behavior; and controlling the measurement of the quantifiable performance parameters to be very accurate initially during the adaptation process and less accurate or not at all as the adaptation operations are done less frequently or discontinued.

* * * * *